(12) United States Patent
Parod et al.

(10) Patent No.: US 7,007,871 B2
(45) Date of Patent: Mar. 7, 2006

(54) MOBILE IRRIGATION MACHINE WITH UNDERGROUND WATER APPLICATION

(75) Inventors: Richard W. Parod, Elkhorn, NE (US); Charles H. Meis, Albion, NE (US)

(73) Assignee: Lindsay Manufacturing Company, Lindsay, NE (US)

( * ) Notice: Subject to any disclaimer, the term of this patent is extended or adjusted under 35 U.S.C. 154(b) by 408 days.

(21) Appl. No.: 09/848,665

(22) Filed: May 3, 2001

(65) Prior Publication Data

US 2002/0162908 A1    Nov. 7, 2002

(51) Int. Cl.
*B05B 3/00* (2006.01)

(52) U.S. Cl. .................. 239/734; 239/728; 239/271; 239/193

(58) Field of Classification Search ............ 239/734, 239/723, 726, 728, 542, 271, 735, 737, 193
See application file for complete search history.

(56) References Cited

U.S. PATENT DOCUMENTS

| | | | |
|---|---|---|---|
| 632,795 A * | 9/1899 | Stoddart | ............... 239/193 |
| 4,011,990 A | 3/1977 | Meis et al. | |
| 4,543,985 A | 10/1985 | Healy et al. | |
| 4,676,438 A * | 6/1987 | Sesser | ............... 239/722 |
| 5,779,163 A | 7/1998 | Gunter | |

\* cited by examiner

*Primary Examiner*—Christopher Kim
(74) *Attorney, Agent, or Firm*—Cook,Alex,McFarron,Manzo,Cummings & Mehler, Ltd.

(57) ABSTRACT

An irrigation assembly has a main pipeline supported at intervals by mobile towers, a plurality of drop tube assemblies at spaced intervals along the pipeline and a collector positioned to receive water from the drop tube assembly. A plurality of targets are positioned on the ground in the paths of motion defined by the movement of the collectors. The targets may be dishes. Each dish preferably has a perforated drain that penetrates beneath the surface of the ground. Interaction between the collector and the target causes the water stored within the collector to be released into the target. The irrigation assembly may provide for underground irrigation without a collector where a dish or trough receives water from the drop tube assembly and underground drains allow for water to be dispersed below the ground.

18 Claims, 5 Drawing Sheets

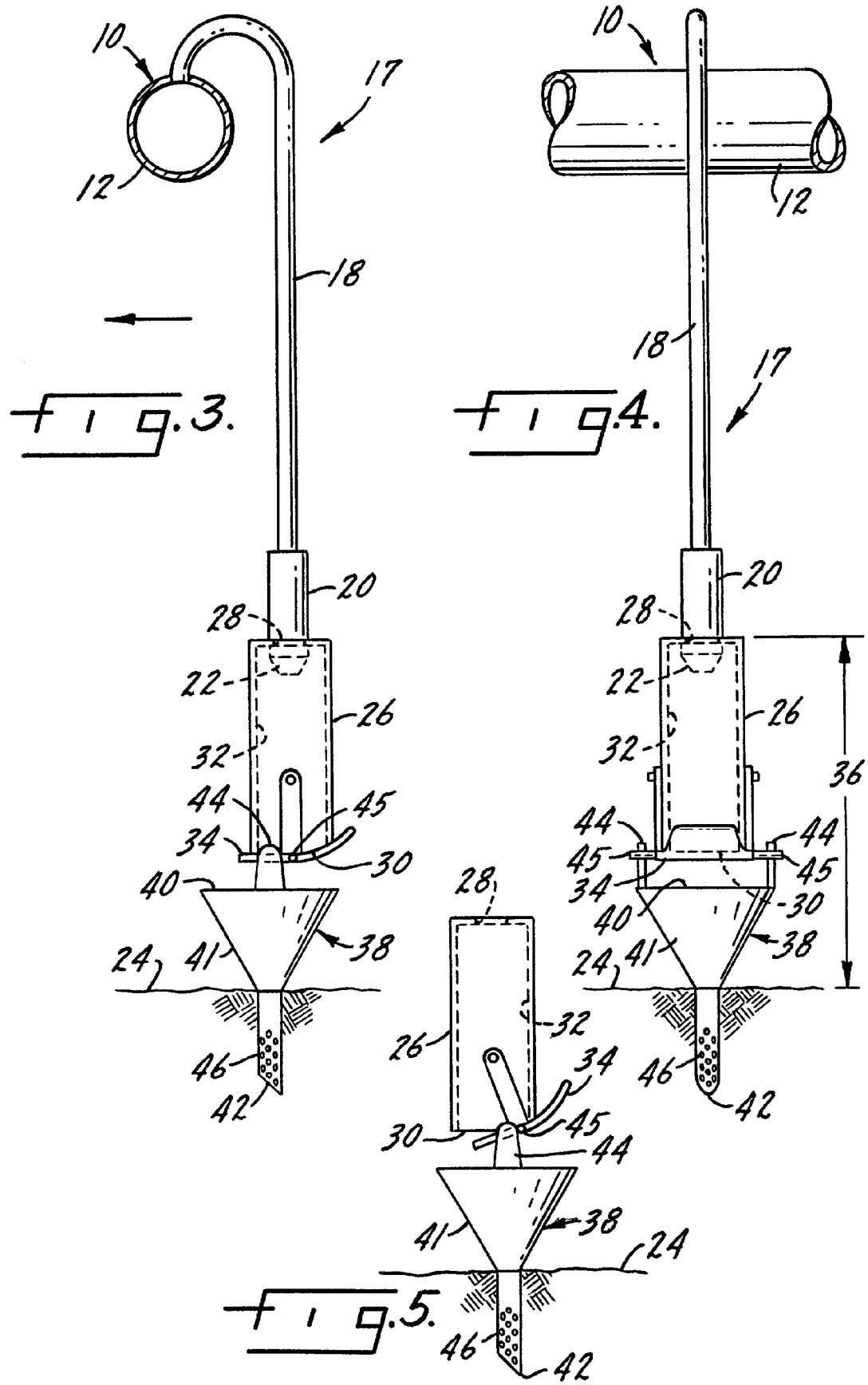

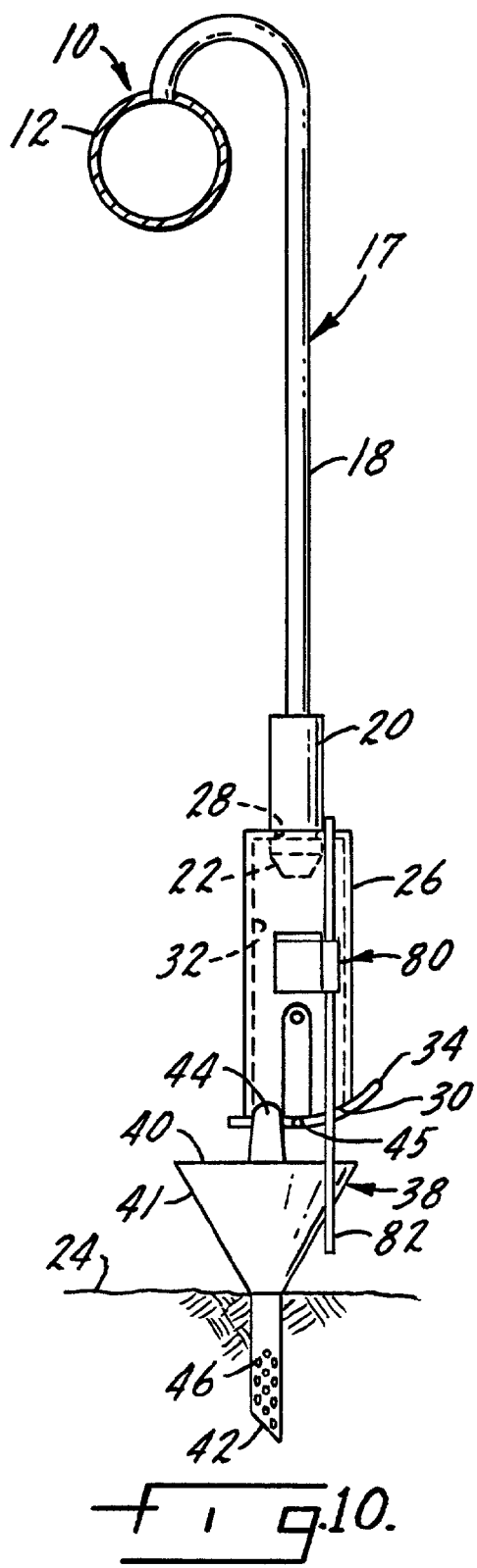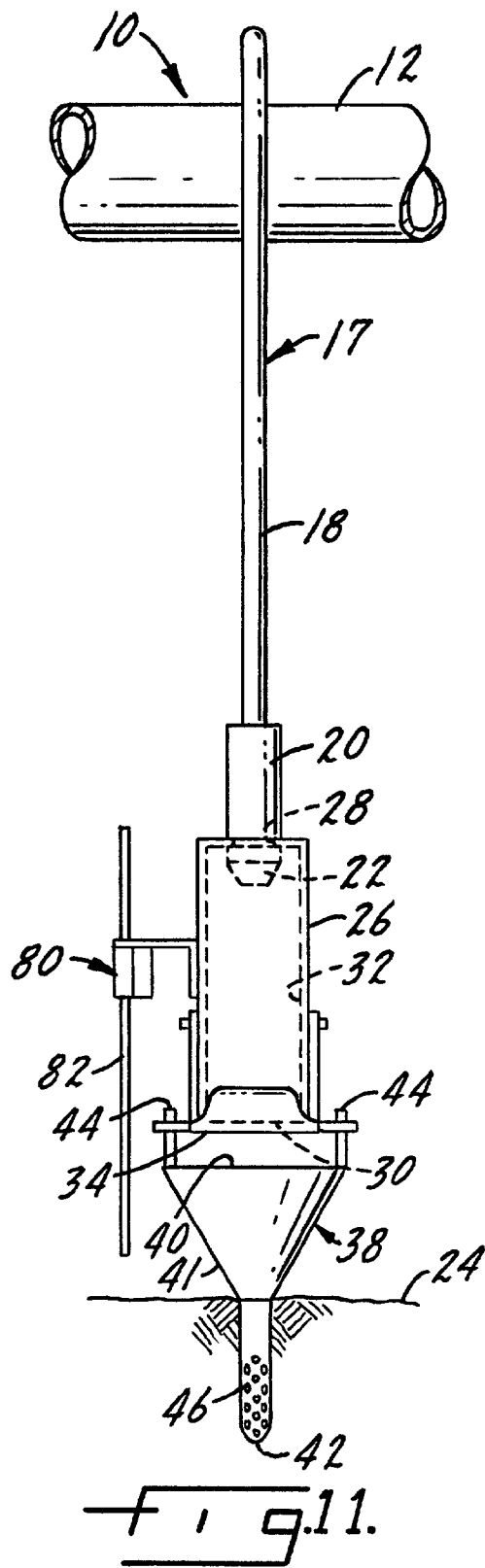

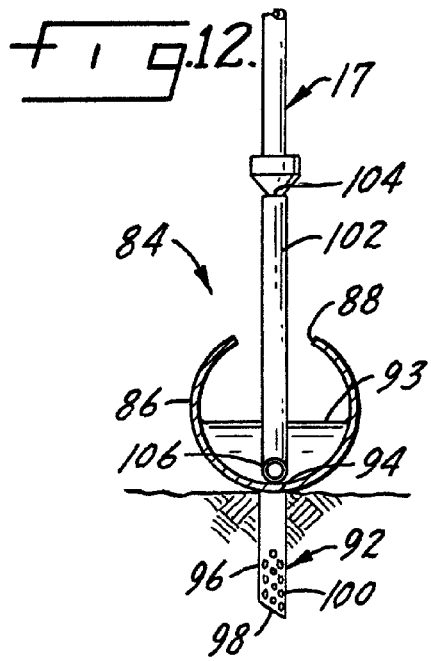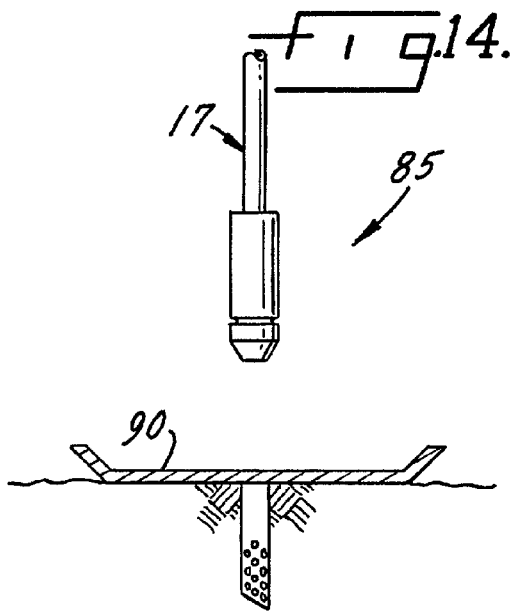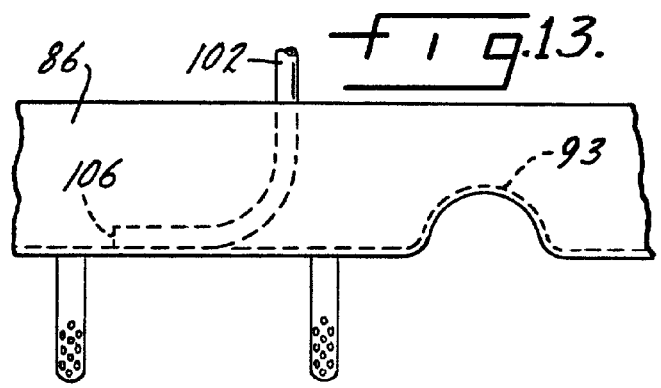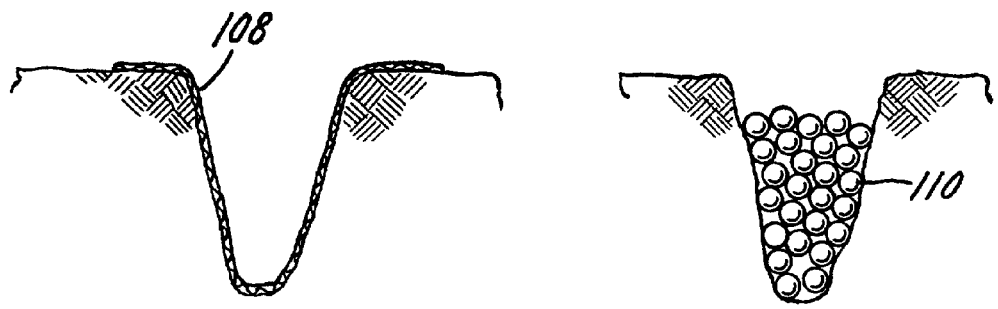

MOBILE IRRIGATION MACHINE WITH UNDERGROUND WATER APPLICATION

BACKGROUND OF THE INVENTION

The present invention relates to mobile irrigation machines such as those used on agricultural fields for watering planted crops or in greenhouse applications.

Conventional irrigation systems have a main pipeline which is supported at intervals by mobile towers. Spray nozzles are connected at various points along the pipeline. The nozzles may attach more or less directly to the main pipeline or to drop tubes that extend out of the top of the main pipeline and curve downwardly to a nozzle or to the bottom of pipe. Pressure regulators may be interposed between the main pipeline and each nozzle to maintain a regulated water pressure entering each nozzle regardless of undulating terrain or pressure losses along the length of the pipeline. This assures that the nozzles will dispense water at a known rate at each point along the main pipeline.

One problem with current irrigation systems is that the emitted water spray from the nozzle is subject to evaporation loss. As soon as the water becomes airborne from the nozzle, some percentage is lost to the atmosphere by evaporation. Further evaporation can occur after the water lands on the plants or the surface of the ground. The percentage lost can be especially significant during dry seasons or in arid climates. Thus, there is a need for an irrigation system which reduces the effect of evaporation on the emitted water spray.

SUMMARY OF THE INVENTION

The present invention relates to irrigation machines having an ability to reduce evaporation losses. This is accomplished in two ways. First, water is not released to the air in small droplets. Second, water is delivered to the crop's root zone, beneath the surface of the ground. The irrigation machine may be of the type having linear, or rotational movement or a combination thereof. These include center pivot machines, laterally movable machines, or machines with steerable corners of the type shown and described in U.S. Pat. No. 5,695,129. The present invention provides an irrigation assembly having a main pipeline supported on mobile towers. A plurality of collectors are in fluid communication with the main pipeline. The collectors receive and retain water from the pipeline for intermittent release onto designated targets. The main pipeline carries the collectors along a path, each collector having its own path. The collectors have the capability of quickly releasing water collected from the main pipeline onto selected targets along their respective paths.

The collectors may be mounted anywhere along the irrigation assembly although it is preferred that the collector be mounted to drop tube assemblies. The collector releases the water therein at controlled locations along the collector path. At each point of release, or target, there is preferably a dish or water receiving receptacle which is impregnated into the soil. The portion of the dish beneath the soil has a plurality of holes or perforations to allow water seepage from the dish into the surrounding soil. During travel of the irrigation assembly, mechanical interaction between the dish and collector causes the water within the collector to be released into the dish.

Release of the water from the collector to the target can occur in several ways. One way is to place a water outlet opening and a valve in a bottom portion of the collector. The valve is normally held in a closed position. Opening of the valve is triggered by a valve actuator attached to the dish. Opening is triggered only when the collector is aligned with the dish and thus the water within the collector is emptied into the dish. Continued movement of the irrigation assembly will disengage the valve actuator from the valve, allowing the valve to return to a closed position. Another way to cause emptying of the collector's contents is for the collector to be pivotally mounted to the irrigation machine at a spindle. Both the collector and the dish are located at predetermined elevation levels such that the engagement between the collector and the dish during travel of the main pipeline causes pivoting of the collector in the direction of the dish. Upon pivoting of the collector, the water therein will pour into the dish and then percolate into the soil through the holes in the dish.

The irrigation machine may also incorporate moisture probes mounted at intervals along the main pipeline for selectively measuring the moisture level of the ground. The moisture probes may be mounted anywhere along the irrigation assembly to allow for selective moisture measurement using a downwardly extending probe. The moisture probe may be movable, for example by a motor drive, which allows for downward extension and upward retraction of the probe for testing, but fixed probes are also possible. The moisture probes could be used to determine whether a collector should be emptied at a certain target or whether emptying should be delayed until a subsequent testing indicates dry soil conditions. If emptying is to be delayed, the moisture probe might also signal a valve to shut off flow into the collector. A valve suitable for such a purpose is shown and described in co-pending application Ser. No. 09/727,181, filed Nov. 30, 2000, the disclosure of which is incorporated herein by reference.

The present invention may be utilized without a collector where a plurality of dishes or troughs receive water from the drop tube assembly. The troughs can be positioned in continuous or spaced orientation and are positioned at least partially within a path of the drop tube assembly so that as the drop tube assembly moves along its path, water is discharged into troughs. A plurality of underground drains are associated within the trough to cause water infiltration directly beneath the ground. The trough may be a pipe with a slot opening at its top. A flexible hose may also be incorporated where one end or inlet is in fluid communication with the drop tube assembly and the other end or outlet extends within the slot of the pipe.

BRIEF DESCRIPTION OF THE DRAWINGS

FIG. 3 is an elevation view of the underground irrigation assembly of the present invention, looking longitudinally of the main pipeline.

FIG. 4 is an elevation view looking from the right side of FIG. 3.

FIG. 5 is a detail view of a collector valve being actuated by a dish.

FIG. 10 is an elevation view of the underground irrigation assembly with a moisture probe assembly.

FIG. 11 is an elevation view looking from the right side of FIG. 10.

FIG. 12 is an elevation view of a portion of an alternate embodiment of the underground irrigation assembly, looking perpendicularly to the main pipeline at a drop tube and trough.

FIG. 13 is an elevation view of the embodiment of FIG. 12, looking from the right side of FIG. 12.

FIG. 14 is a view similar to FIG. 12, showing a further alternate arrangement of a drop tube and trough.

FIG. 15 is an elevation view of a target, looking perpendicular to the main pipeline.

FIG. 16 is an elevation view of an alternate target, looking perpendicular to the main pipeline.

DETAILED DESCRIPTION OF THE INVENTION

Figure 1:
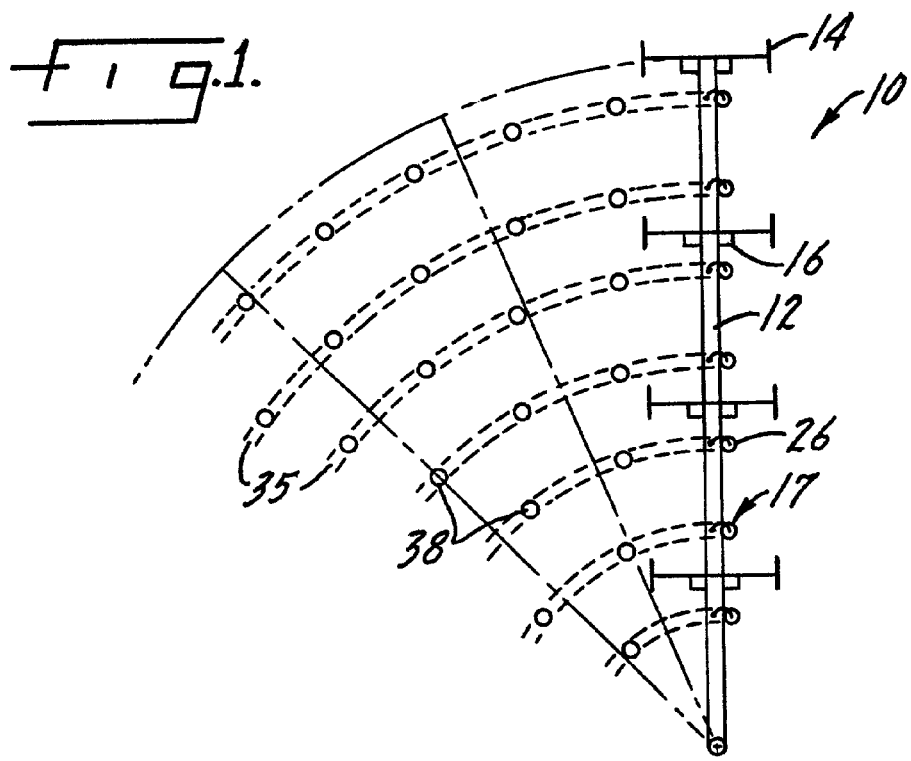
FIG. 1 is a diagrammatic plan view of a center pivot irrigation machine equipped with the underground irrigation assembly of the present invention.

The irrigation machine 10 of the present invention includes a main pipeline 12. The pipeline comprises a plurality of individual pipe sections which are joined together at flexible joints. Each section is supported at intervals by mobile towers 14. Each of the mobile towers 14 has a drive motor 16 for propelling the tower across a field. Movement of the irrigation machine may be linear or rotational or any combination thereof; the present invention could be used on any of these types of machines. In a center pivot point irrigation machine, shown generally in FIG. 1, one end of the main pipeline remains fixed at a central pivot point while the outer end rotates about that central pivot point. In a laterally moveable irrigation system, shown generally in FIG. 2, both ends of the main pipeline section move in a lateral direction in relation to the longitudinal axis of the machine. Water supplies are connected to either type of machine in the conventional manner.

The irrigation machine 10 also has a plurality of drop tube assemblies indicated generally at 17. The drop tube assemblies are connected to the main pipeline at spaced intervals. As shown in FIG. 3, each drop tube assembly 17 includes a drop tube 18, a pressure regulator 20, and a nozzle 22 although other combinations for the drop tube assemblies are possible and will be apparent to those skilled in the art. Each drop tube 18 may have a conventional goose neck portion that extends out of the top of the main pipe section 12 and curves downwardly to a straight portion of the tube. The distal end of the drop tube 18 has a pressure regulator 20 attached to it. The pressure regulator 20 controls the water pressure presented to the nozzle in order to allow a consistent, known rate of distribution of water through each nozzle. The nozzle 22 is attached downstream of the regulator 20 and directs water downwardly toward the ground, indicated at 24.

A collector 26 is suitably connected to the drop tube assembly 17. The collector 26 has walls defining a water inlet at top end 28, a water outlet at bottom end 30, a cavity 32 and a valve 34. The top end 28 is generally closed and in fluid communication with the drop tube assembly although it is possible to construct a collector with the top end left open. The bottom end is normally held in a closed position by the valve 34. The top end 28 is preferably mounted to the drop tube assembly 17 at a collector elevation 36 (FIG. 4).

The nozzle 22 is positioned relative to the collector 26 such that all water flows from the nozzle into the collector. Depending on the nozzle type this may require the nozzle to be disposed within the collector's cavity. Or it may be possible to position the nozzle outside the collector with all flow directed into the collector's inlet opening. Placing the nozzle inside the collector has the advantage of minimizing evaporation due to exposure of water droplets to the air.

The valve 34 is located in the bottom end 30 and is normally closed so that the collector can receive and store water therein. During operation of the irrigation machine 10 movement of the pipeline will occur in the direction indicated by the arrow (FIG. 3) causing corresponding movement of the collector. It will be realized that each collector will traverse its own collector path 35 (FIGS. 1 and 2) as it moves with the pipeline. The collector 26 is preferably made of polyethylene or any other like materials. The collector construction is preferably a cylindrical pipe or sleeve having a four-inch inner diameter, although other sizes and shapes are possible so long as they permit release of the collector's contents in a relatively short time.

The connection between the collector and the drop tube assembly preferably forms a relatively fluid-tight seal which minimizes evaporation losses. It is also possible for the collector to be mounted directly to the main pipeline although it is preferred that the collector be attached to one of the drop tube, the pressure regulator or the nozzle. The attachment of the collector to the drop tube assembly or pipeline may also include one or more adaptor members, pivots, sleeves, fittings or the like in order to position the collector accordingly. Also, it may be advantageous to locate all or a portion of one or both of the pressure regulator and nozzle within the cavity of the collector.

The valve 34 shown in FIGS. 3-5 has a normally closed pivotable member generally external to the collector. The external member can be displaced from its normally closed position by mechanical engagement with a valve actuator on a ground-mounted dish as will be described below. Variations of the valve and valve actuator are also possible. One alternate type of valve that can be used is a flapper type valve similar to those used in water closets. The flapper valve is mounted inside the collector and normally closes an opening in the bottom of the collector. It would be triggered by a valve actuator, either mechanical or electrical, located either on a dish or elsewhere. The flapper valve also may be triggered by a lever arm or the like connected to the valve. Upon triggering of the valve, the flapper valve would open allowing a large volume of water to flow out of the collector in less than a minute. Opening of the valve causes a hinged flapper to be moved upwards into the column of water within the collector such that the flapper floats or is suspended within the water. Actuation of the valve keeps the flapper suspended within the column of water until the water is expelled. Once the water is discharged the flapper falls back into place thus closing the valve. The flapper has a shape which is molded to fit into the valve opening at the collector bottom end and thus may have any shape as needed based on the chosen shape of the opening. Other types of valves are possible and will be apparent to one skilled in the art. These might include solenoid actuated valves or other electrically-controlled valves.

Figure 2:
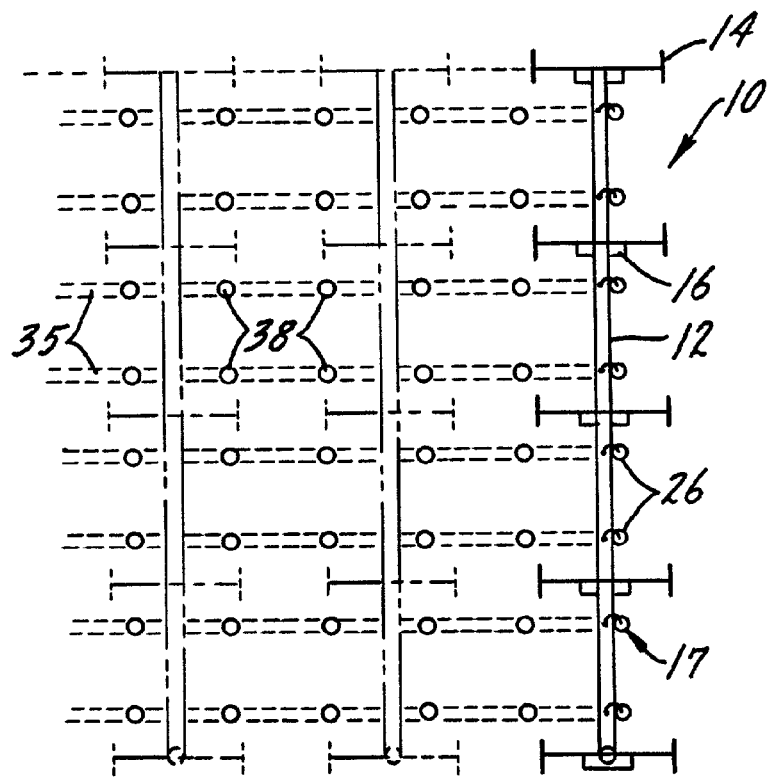
FIG. 2 is a diagrammatic plan view of a laterally movable irrigation machine of the present invention.
Figure 6:
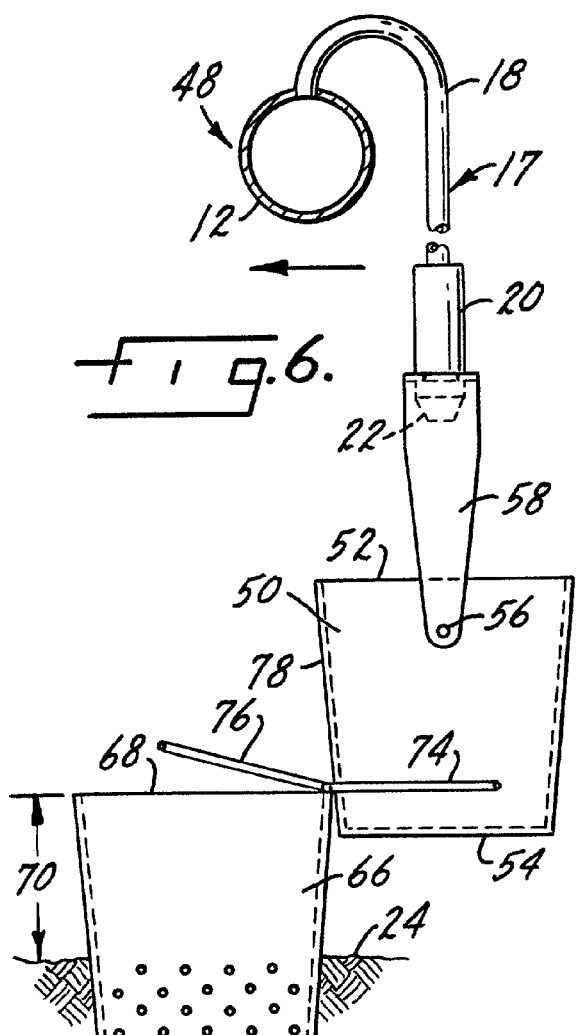
FIG. 6 is an elevation view, similar to FIG. 3, of an alternate embodiment of the present invention.
Figure 7:
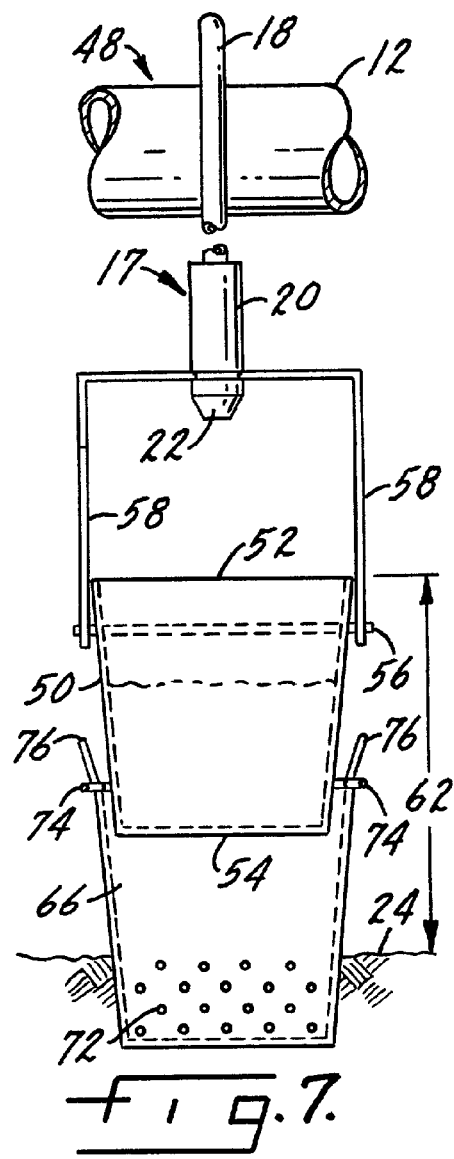
FIG. 7 is an elevation view looking from the right side of FIG. 6.
Figure 8:
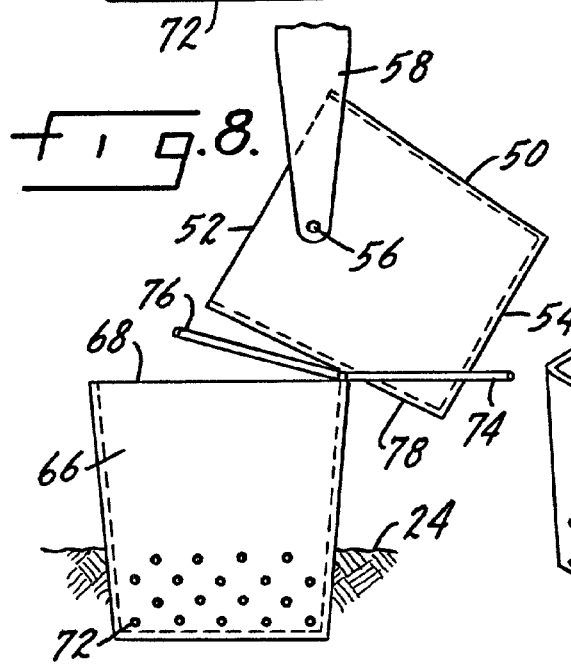
FIG. 8 is an elevation view of a pivoting collector of FIG. 6.
Figure 9:
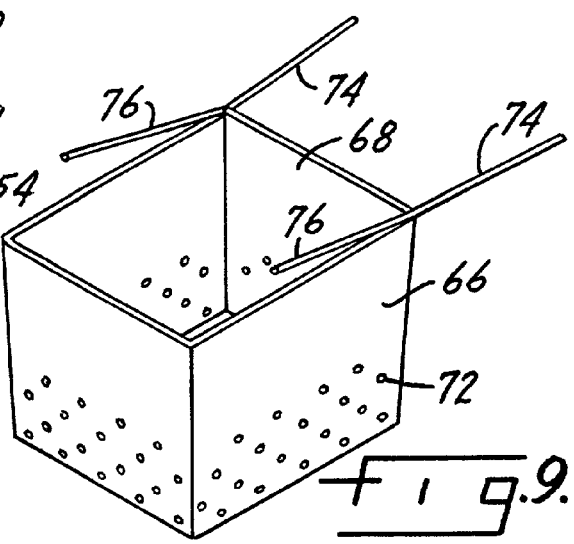
FIG. 9 is perspective view of a dish.

As shown in FIGS. 1 and 2 there are a plurality of stationary targets or dishes 38 placed on the ground at spaced locations along each of the collector paths 35. The dishes preferably extend partially under the surface of the ground 24. FIGS. 3–5 illustrate details of a dish. The dish 38 has an open upper end 40, sides 41 and a drain 42. The drain penetrates beneath the soil surface as shown. The dish upper end 40 mounts a valve actuator 44 which engages pins 45 on the valve 34 of a collector positioned over the dish. The actuator moves the valve into an opened position during passage of a collector 26 over a dish. Within the ground, the drain 42 of the dish may have a plurality of holes or perforations 46. The dish may have numerous holes located therein either on the sides, the drain, a bottom of the dish, or any combination of the foregoing, but the location, size and position of the holes will depend on soil characteristics and other factors. For instance, where the soil conditions are very porous or the roots of the crop very shallow, the dish may have a plurality of holes located in the sides only.

Looking briefly at FIGS. 15 and 16, alternate embodiments of the targets are shown. As seen here the target also may be a hole, channel or trench instead of the dish. In fact, the term "target" therefore is understood to mean both dish and non-dish forms of the invention. The hole is dug within the ground in the collector path 35. A mesh or web 108 may be placed within the hole as a liner to minimize soil erosion or keep the hole from caving in with soil. The holes also could be filled with aggregate 110 such as biodegradable particles, spherical balls, or waste products which minimize soil erosion and water evaporation. If required by the soil characteristics, both the mesh and the aggregate may be used together. If the target is in the form of a channel, it may be dug along continuous or selected portions of the collector path 35 which are shown in FIGS. 1 and 2. Although FIGS. 15 and 16 are views perpendicular to the main pipeline, the direction of the channel could be altered so long as at least a portion of the channel is dug within the collector path 35. This alteration will be described in more detail below in connection with a further alternate embodiment.

Returning to FIGS. 3–5, the valve actuator 44 may be of a mechanical type which physically unseats the valve 34. Or the valve actuator could be of an electrical type which triggers a circuit resulting in an opening of the valve. Upon actuation of the valve 34 by the valve actuator 44, water contained within the collector cavity 32 will flow into the dish 38. Thereafter, the water within the dish 38 will flow through the holes 46 and percolate into the ground 24. The value actuator 44 may be of an electrical type in the form of a metal wire or wires which trigger opening of the valve. Or metal wires could be located on the collector 26 and trigger opening of the valve when the wires are actuated by contact with the target or dish. The valve actuator could further have a local logic device or smart chip which is located on or near the target or dish, or alternatively, the logic device could be located somewhere on the movable irrigation assembly or incorporated into the valve. The logic device would tell the valve to open for release of water or to remain closed so as to prevent the release of water and it further may record the soil moisture data up to several irrigation cycles and/or monitor the cycles when the irrigation machine did or did not release water over the target. The device may be a computer chip, microchip or other intelligent device which triggers the valve actuation.

Actuation between the target and the collector may also occur through non-physical contact. For instance, a signal may be emitted from a transmitter located on the irrigation machine and then the signal is reflected back by the target to a receptor located on the irrigation machine. Radio waves, sound waves, magnetic fields or other means could be used to actuate the valve. The transmitter may be emit intermittent signals at a certain frequency and then listen for return signals from a reflector at the same frequency. In one example using electromagnetic principles, the transmitter could be made of looped wire which induces a magnetic field. The transmitter would radiate energy in the direction of a circuit at same frequency of the circuit. The circuit would be attached on or near the target and would be capable of absorbing energy at the emitted frequency and reflecting it back at the same frequency. The circuit may have a resistor, capacitor and inductor but no voltage or current source. The radiating energy would be absorbed by the circuit thus charging the circuit. When the transmitter stopped radiating energy, the circuit would re-radiate the energy back to the receptor at the same frequency thus forming a sympathetic resonant response. When the maximum amplitude of the sympathetic resonant response was detected, the collector would lie over the target and the valve could be triggered to open. A logic device could be incorporated to determine the maximum amplitudes of the sympathetic resonant responses.

The dish 38 may have any dimension but it is preferred that the dish holds approximately 3 gallons of water. The dish may be made of any material or perhaps be made of biodegradable plastic, waste product or livestock byproduct. The dish may also have any shape such as, but not limited to cylindrical, rectangular, or funnel shape. The upper end of the dish may form an elongated trough that will receive water from the collector over an extended portion of the collector path. An average dish depth below the ground surface is approximately 6 inches. Alternate dish depths are possible and will be determined based on certain factors such as soil characteristics, root zones and the type of plants. A plurality of dishes are possible so long as the dishes are positioned within the collector paths. Where numerous dishes are contemplated, it is possible that the dishes may be automatically installed using a drilling method which prevents impaction of the soil and which improves soil porosity. The method would utilize a machine which drills holes at selected points along the collector path and then inserts the dishes therein. Where removal of the dishes is required, a dish removal method may be used to extract and collect the dishes. In the case of the dish being made of biodegradable materials, the dish will have a certain useful life span but not have to be removed because it will disintegrate over time.

During operation of the irrigation machine 10, water is supplied to the main pipeline 12 from a well, reservoir or other water source and flows to the plurality of drop tubes 18. Water flows to the nozzle 22, controlled by the pressure regulator 20, and out the nozzle into the collector 26 where it is retained until the collector arrives over a dish. Release of water stored within the collector is accomplished by opening the valve 34 which is triggered when the valve actuator 44 of a dish 38 engages the valve 34 on the collector bottom end 30. Emptying of the collector's fluid contents occurs quickly when the collector is positioned over the dish. Because the collector will continue moving according to the speed of the irrigation machine it is preferable that the release of the collector's contents occur in less than about a minute. Obviously the dish will be sized to accommodate some pipeline movement during emptying of the collector. Continued movement of the collector causes the valve 34 and valve actuator 44 to disengage and the valve to reseat itself on the collector bottom end 30. Once the valve returns to a substantially closed position, the collector begins to refill for the subsequent application. As shown in FIGS. 1 and 2 the collector may release and refill numerous times during a single circuit of the irrigation assembly around or across a field. Any number of collectors may be located along the main pipe section 12 as needed to deliver the desired flow rate. Each collector's contents are distributed within the dishes located within the collector path 35.

The present invention significantly reduces water loss due to evaporation. The connection between the nozzle and the collector is fluid-tight so as to prevent evaporation loss. The collector stores water outflow from the nozzle within its cavity and upon valve actuation empties the water therein. Evaporation loss at the dishes may also be minimized because the water therein will be in the process of infiltrating into the ground through the plurality of holes 46.

In FIGS. 6–9 an alternate irrigation assembly 48 is shown with like parts shown with like numbers. A collector 50 is shown having an open top end 52 and a closed bottom end 54. The collector top end 52 is pivotally mounted to the irrigation assembly along a spindle 56 which is connected to the assembly along arms 58 having both horizontal and vertical components. In its normal condition, the collector top end 52 is positioned directly below the nozzle 22 to receive water therefrom at a collector elevation 62 (FIG. 7) which is located at a predetermined height above the ground 24. A dish 66 may have any dimension or shape and is also preferably located partially within the ground 24. The dish upper end 68 is located at an elevation 70 (FIG. 6) which overlaps the collector bottom end 54. Other elevations of the dish upper end 68 are also possible so long as it is located below the spindle 56. There are a plurality of holes 72 within the dish and guide pieces 74 and 76 are fixed to the dish upper end 68. Guide pieces 74 are generally parallel to the dish upper end 68 and guide pieces 76 are positioned at an obtuse angle from guide pieces 74 to aid in positioning the collector 50 during pivoting thereof.

During operation of the assembly shown in FIGS. 6–9 movement of the irrigation assembly will cause corresponding movement of the collector allowing the collector to follow the collector path. At stationary points along the collector path, the collector 50 will encounter a dish 66 along a leading side edge 78 of the collector. Continued movement of the assembly will cause pivotal movement of the collector due to force applied by the dish upper end 68 to the collector side edge 78. Continued pivotal movement allows the accumulated water within the collector to pour into the dish 66. It is possible that an upper portion of the collector side edge 78 may be cut away to facilitate the emptying of accumulated water therein. Guide pieces 74 and 76 accurately position the collector 50 before and during the receipt of water by the dish 66. Continued movement of the pipeline 12 disengages the collector from the dish causing the collector to return to its original upright orientation.

In the further alternate embodiment of FIGS. 10 and 11, a moisture probe assembly 80 may be mounted to the irrigation assembly 10. The moisture probe assembly 80 has a downwardly extending moisture probe 82 to provide testing of the moisture level of the ground when the irrigation machine is in use. Although the moisture probe assembly 80 is shown as being mounted adjacent to the collector 26 other positions are also possible. The moisture probe assembly 80 may be mounted to any portion of the irrigation assembly for selectively testing the ground moisture level during operation, including but not limited to, being mounted to one of the drop tube, the pressure regulator, or the nozzle. The moisture probe may be mounted for stationary use or, alternatively, may be movably mounted. Where the moisture probe is movable, it may extend downwardly for contact with the ground by means of a motor drive which also allows upward retraction after the moisture measurement has been completed. The moisture probe is preferably positioned at various points along the irrigation assembly to allow for selective testing of the ground moisture level during operation of the irrigation assembly. It is possible that the moisture probe could be utilized to test the moisture or water level within the dish.

In the case of the stationary moisture probe, it could be mounted to the irrigation assembly either on the target or the dish 38. The probe may contain a computer chip, microchip or smart chip which stores the recent history of soil moisture for the last several irrigation cycles. If necessary, the chip may have a power source such as a battery. The information that is stored within the chip could be relayed to the irrigation machine as the machine passes over the target either by electrical contact or by non-physical contact, similar to the ways already described herein. When the moisture probe is located on the target, it may operate as the valve actuator. A central computing or logic device can be incorporated within the irrigation machine which helps process the information obtained from one or more moisture probes.

It can be seen that the present invention provides an apparatus that delivers irrigation water under the surface of the soil, rather than spraying it through the air and onto the surface of the soil or onto the plants themselves. This delivers more of the water to the roots of the plants where it does the most good and minimizes opportunities for losses to evaporation. The collectors allow for a constant flow of water out of the main pipeline using existing spray nozzles. This allows known flow rate calibrations to be used. But instead of immediate dispersal of the water, it is retained until the collector is aligned with a ground-penetrating dish. Then the stored water is released at a relatively high rate so a large amount of water can be deposited in the dish. The water then percolates into the ground through perforations formed in the underground portion of the dish.

FIGS. 12 and 13 show an alternate irrigation assembly 84 which has a plurality of drop tube assemblies but no collectors thereon. The drop tube assemblies, one which is shown at 17, each define a path similar to the collector paths shown in FIGS. 1 and 2. But the assembly 84 provides for the continuous discharge of water instead of the water being retained by a collector. A plurality of troughs positioned on the ground receive the water from the drop tube assemblies. The troughs are each positioned in the path of one of the drop tube assemblies and generally follow the path direction. An individual trough may be a pipe with an opening or slot 88 in a top portion thereof which receives the water from its associated drop tube assembly.

Underground drains 92 are located at spaced intervals along the trough 86. Each trough may have one or more drains. Where more than one drain is associated with a trough, the trough preferably is shaped and positioned within the drop tube path following the direction thereof. As previously described, the trough also may be formed within the ground itself by digging a hole, channel or trench for receiving the water. A mesh or web may be placed over or in the hole or channel so as to protect it from erosion or from becoming filled with soil, and as an alternate or additional measure, aggregate may be placed therein. The trough may be continuous or there may be numerous troughs placed or formed in a continuous or intermittent design. An intermittent design would have spacing between the troughs so that water effluent would be deposited onto the troughs as well as onto the bare soil or crops between the troughs. Or it is also possible that a trough has a main portion that is located within the drop tube path and tributary portions that are located in a direction transverse to the drop tube assembly path. The tributaries would have their own drains in order to optimize the infiltration of water to root structures. Weirs or dams 93 may be suitably placed in the troughs to control water flow therein. For example, where a continuous trough of the pipe type shown in FIGS. 12 and 13 is used, undulations in the terrain may cause water deposited in the trough to run rapidly toward a low point and largely flow past a drain at a higher elevation. A weir located on the low side of the higher drain's inlet may prevent underwatering at that drain. The dams 93 may be inserted into the trough or be formed as part of the trough. In FIG. 13, the dam 93 is shown as part of the trough with a rounded surface spanning the width of the trough, but other shapes and sizes of the dam are possible. The dam also may be a relatively thin planar surface or a block which is inserted into the trough at selected locations. Aggregate may be placed at selected locations along the trough either in addition to or instead of the dam. If aggregate is used, it may also minimize the tendency of water to run toward lower elevation points. Each underground drain has an inlet at a top end 94, sides 96 and a bottom end 98. At least one outlet is positioned underground either at the sides 96 or at the bottom end 98 or both. The outlet also may be a plurality of perforations or holes 100 located at either or both of the sides or bottom end.

The purpose of the trough is to facilitate water filtration into the ground and minimize water loss due to evaporation. During use, movement of the irrigation assembly will cause the drop tube assemblies to move along their paths. If the irrigation machine is set for continuous water discharge, then the troughs receive water from the drop tube assembly whenever the drop tube passes over the trough. Where the troughs are laid continuously, the troughs will receive the water. Then the water will flow into the drains and percolate into the ground. Little water will be lost to evaporation. Due to certain factors, it may not be desired to place the troughs continuously. So, in the case of intermittent placement of the troughs, water from the drop tube assembly will flow into the troughs when the two are in alignment. After the drop tube assembly has passed over the trough but before it has reached the next trough, the water effluent from the drop tube assembly will be deposited on the ground or plants located between the placement of troughs.

The irrigation assembly 84 may include a flexible hose 102 which is in fluid connection with the drop tube assembly 17. The hose has an inlet 104 which preferably is attached to one of the drop tube, regulator or nozzle. The hose preferably is made of any flexible type of material. The hose extends downwardly to a hose outlet 106 which is placed on the trough, in the trough or in the general vicinity thereof. The hose outlet 106 may be received by the slot 88 of the trough. The slots are located within the path of the drop tube assembly so that during normal operation of the irrigation machine the hose outlet is in alignment with the slots. Even where the placement of troughs is intermittent, the alignment between the slots and the hose will allow for the hose outlet to move over or within the trough and discharge the water therein. Where a hose used, it is believe that evaporation loss will be reduced further because the water is discharged directly from the hose outlet into the trough. Where weirs are used, they may be configured to allow passage of the hose.

Other trough shapes are possible. For instance, FIG. 14 shows an alternate irrigation assembly 85 which has no collector. It has an alternate trough 90 having a generally planar surface with upwardly extending sides which allows the trough to receive water therein. This trough can be used with a conventional drop tube assembly 17. The troughs may also be configured as holes or channels within the ground. Mesh and/or aggregate may be added to the troughs as needed.

Whereas a preferred form of the invention has been shown and described, it will be realized that there may be modifications, alterations, and substitutions made thereto without departing from the scope of the following claims. For example, while the ground-penetrating target or dish is preferred for delivering water directly into the root zone, there may be some crops and/or soil conditions that do not require the target. In these instances intermittent release of water stored in the collectors onto the ground surface may be sufficient to adequately irrigate the crops. A valve actuator or mechanism for tipping the collector would still be required to empty the collectors but these would not necessarily have to be incorporated in the target. An electrical valve actuator could be used or an electrical trigger such as metal wires could be affixed to the ground in the collector path. Or there could be a mechanical device need not receive the water from the collector. Also, while the above description contemplates use of a conventional pressure regulator and nozzle combination at the end of each drop tube, other arrangements could be used such as a regulator valve plus a nozzle. Any suitable volumetric metering device or flow control device could be substituted for the regulator and nozzle.

What is claimed is:

1. An irrigation assembly comprising a main pipeline connected to a water supply, the pipeline being supported at intervals by mobile towers, a plurality of drop tube assemblies extending downwardly from the main pipeline, the movement of the drop tube assemblies over the ground defining paths, and a plurality of stationary troughs positioned at least partially above the surface of the ground and at least partially within the paths for receiving water from the drop tube assemblies, each trough having at least one wall which is adapted to engage a surface of the ground, and each trough defining a fluid passageway therethrough which permits water to flow from the trough into the ground.

2. The irrigation assembly of claim 1 wherein each trough has a plurality of underground drains adapted for penetrating the ground, each drain being located at spaced locations along the trough and defining at least one opening, which opening of the drain defines at least a portion of the fluid passageway through the trough for permitting water flow through the trough.

3. The irrigation assembly of claim 2 wherein each underground drain has an inlet in fluid communication with the trough and at least one outlet located within the ground.

4. The irrigation assembly of claim 1 wherein the shape of each trough generally follows the path of a drop tube assembly.

5. The irrigation assembly of claim 1 wherein at least one trough has a bottom surface which is substantially planar with upwardly extending side edges.

6. The irrigation assembly of claim 1 wherein at least one trough is a pipe with a slot located in the top thereof.

7. The irrigation assembly of claim 6 wherein the slot is longitudinally positioned along the pipe.

8. The irrigation assembly of claim 6 wherein the trough further comprises a main pipe section and tributaries in fluid communication with the main pipe section, each tributary having at least one drain.

9. The irrigation assembly of claim 6 further comprising a weir mounted in the pipe.

10. The irrigation assembly of claim 1 wherein the drop tube assembly further comprises a hose having an inlet being in fluid communication with the pipeline and an outlet which directs water into the trough.

11. The irrigation assembly of claim 10 wherein at least one trough is a pipe with a slot located in the top thereof.

12. The irrigation assembly of claim 1 further comprising selected one of a weir and a dam being positioned within the trough for controlling water flow therein.

13. An irrigation assembly comprising a main pipeline connected to a water supply, the pipeline being supported at intervals by mobile towers, a plurality of drop tube assemblies extending downwardly from the main pipeline, the movement of the drop tube assemblies over the ground defining paths, a plurality of water receiving receptacles adapted to engage the surface of the ground, each water receiving receptacle having at least one wall, and each water receiving receptacle defining at least one fluid passageway therethrough which permits water to flow from the water receiving receptacle into the ground.

14. The irrigation assembly of claim 13 wherein each water receiving receptacle further includes at least one underground drain which is adapted for penetrating the ground, the drain defining at least one opening, which opening of the drain defines at least a portion of one fluid passageway through the water receiving receptacle for permitting water flow through the water receiving receptacle.

15. The irrigation assembly of claim 14 wherein each underground drain has an inlet in fluid communication with the passageway and at least one outlet located within the ground.

16. The irrigation assembly of claim 13 wherein at least one wall of the water receiving receptacle is substantially planar.

17. The irrigation assembly of claim 13 wherein at least one wall of the water receiving receptacle is substantially circular with a slot located in the top thereof.

18. The irrigation assembly of claim 13 wherein the water receiving receptacle forms a funnel.

* * * * *